United States Patent
Song et al.

(10) Patent No.: US 6,972,897 B2
(45) Date of Patent: Dec. 6, 2005

(54) LONG-BAND ERBIUM DOPED FIBER AMPLIFIER

(75) Inventors: Kwan-Woong Song, Seoul (KR); Seong-Taek Hwang, Pyongtaek-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 10/264,967

(22) Filed: Oct. 4, 2002

(65) Prior Publication Data

US 2003/0151800 A1 Aug. 14, 2003

(30) Foreign Application Priority Data

Feb. 14, 2002 (KR) .......................................... 2002-7895

(51) Int. Cl.[7] .............................................. H01S 3/00
(52) U.S. Cl. ................................... 359/349; 359/341.3
(58) Field of Search .......................... 359/349, 341.32, 359/341.3, 341.1

(56) References Cited

U.S. PATENT DOCUMENTS

| | | | |
|---|---|---|---|
| 6,222,670 B1 | 4/2001 | Ryu et al. .................... | 359/345 |
| 6,233,092 B1 | 5/2001 | Flood et al. ................. | 359/345 |
| 6,288,834 B1 | 9/2001 | Sugaya et al. ............ | 359/341.1 |
| 6,411,431 B2 * | 6/2002 | Sugaya et al. ............ | 359/341.1 |
| 6,501,594 B1 * | 12/2002 | Hwang et al. .......... | 359/341.32 |
| 6,501,873 B1 * | 12/2002 | Moon et al. .................... | 385/27 |
| 6,674,570 B2 * | 1/2004 | Song et al. .................. | 359/349 |
| 6,731,426 B2 * | 5/2004 | Yeniay et al. .......... | 359/341.32 |

FOREIGN PATENT DOCUMENTS

| | | | |
|---|---|---|---|
| EP | 1067716 | 1/2001 | ........... H04B/10/17 |
| EP | 001087550 A1 * | 3/2001 | |
| JP | 10-290039 | 10/1998 | ............. H01S/3/10 |
| JP | 10-294510 | 11/1998 | ............. H01S/3/07 |
| JP | 2001-077451 | 3/2001 | ............. H01S/3/10 |
| JP | 2001-085768 | 3/2001 | ............. H01S/3/06 |
| JP | 2001-196672 | 7/2001 | ............. H01S/3/10 |

* cited by examiner

*Primary Examiner*—Mark Hellner
(74) *Attorney, Agent, or Firm*—Cha & Reiter, L.L.C.

(57) ABSTRACT

The present invention discloses a long-band Erbium doped-fiber amplifier including: a first Erbium doped fiber with a predetermined length, coupled to a first pumping light source through a first wavelength-selective coupler, for amplifying a C-band optical signal by supplied pumping light; a second Erbium doped fiber with a predetermined length for amplifying an L-band optical signal by a second pumping light source; a feedback loop for recycling a specific C-band wavelength generated in the amplification of the first Erbium doped fiber as the second pumping light source of the L-band optical signal; a tap coupler formed between the first and second Erbium doped fibers, for dividing the optical power amplified in the first Erbium doped fiber, for supplying a predetermined ratio of optical power to the second Erbium doped fiber, and for re-inputting the residual optical power to the feedback loop; and, a second wavelength-selective coupler for coupling the signal light transmitted from the tap coupler to the first Erbium doped fiber.

10 Claims, 4 Drawing Sheets

LONG-BAND ERBIUM DOPED FIBER AMPLIFIER

CLAIM OF PRIORITY

This application makes reference to and claims all benefits accruing under 35 U.S.C. Section 119 from an application entitled, "Long-band erbium doped fiber amplifier," filed in the Korean Intellectual Property Office on Feb. 14, 2002 and there duly assigned Serial No. 2002-7895.

BACKGROUND OF THE INVENTION

1. Field of the Invention

The present invention relates generally to a fiber amplifier for amplifying an optical signal in a wavelength-division-multiplexing (WDM) communication system and, in particular, to a long-band erbium doped-fiber amplifier (L-band EDFA) using a ring laser.

2. Description of the Related Art

In addition to the existing conventional-band (C-band) transmission, research has been actively focusing on the development of an L-band transmission. One important area in this optical-transmission technique is the detection of the fiber amplifier used for amplifying optical signals in the transmission line or each node to ensure a proper function thereof.

A rare-earth doped-fiber amplifier has been widely used as the L-band fiber amplifier. When compared to the C-band rare-earth doped-fiber amplifier, the L-band rare-earth doped-fiber amplifier shows a lower amplification efficiency. To overcome this problem, using a different wavelength pumping light source besides 980/1480 nm pumping light has been actively investigated. In addition, a different amplification method using an RAMAN amplifier has been suggested. However, these proposed solutions add manufacturing costs and reduces the amplification efficiency.

As a background, the constitution of the conventional L-band EDFA 10 will be explained with reference to FIGS. 1 and 2. Note that the C-band ranges from 1530 to 1560 nm, and the L-band ranges from 1570 to 1610 nm. As shown in FIG. 1, a first example of the conventional L-band EDFA 10 uses an Erbium doped fiber 100 as an amplification medium, prevents the back flow light by inserting first and second optical isolators 102 and 104 into the front and rear ends of the Erbium doped fiber 100, while coupling a forward 1550 nm pumping laser diode 108 to the front portion of the Erbium doped fiber 100 by using a 1550/1590 nm wavelength-selective coupler (WSC) 106. The 1550 nm pumping light emitted from the forward 1550 nm pumping laser diode 108 excites Erbium ions existing in a ground state of the Erbium doped fiber 100. The L-band optical signal passing through the Erbium doped fiber 100 is amplified according to the simulated emission of the excited Erbium ions and finally outputted to the output terminal.

However, the conventional L-band rare-earth doped-fiber amplifier requires a lot of Erbium doped fibers and a high pumping power to obtain a sufficient gain as the Erbium doped fiber has lower absorption and emission values in the L-band than in the C-band. In addition, to obtain a high output power and a good noise level, the pumping light source of 1530 to 1560 nm band (C-band) is used, instead of using the pumping light source of 980 or 1480 nm band.

FIG. 2 is a structural diagram illustrating a second example of the conventional L-band EDFA 20. As shown in FIG. 2, the conventional L-band EDFA 20 is an L-band fiber amplifier, which can amplify an L-band optical signal using a C-band optical signal. The optical signal passed through a first optical isolator 202 and transmitted in the forward direction is amplified by a C-band first Erbium doped fiber 200. The first Erbium doped fiber 200 amplifies the signal light using the bi-directional pumping light provided by a forward 980 nm pumping laser diode 208 through a 980/1550 nm WSC 206 and a backward 1480 nm pumping laser diode 212 through a 1480/1550 nm WSC 210. The first optical isolator 202 serves to induce the light to travel in one direction. Here, only a selected wavelength of the amplified optical signal is filtered through a tunable filter 214, and the signal light selected by a second optical isolator 204 is propagated in the forward direction.

The optical signal propagated through the second optical isolator 204 provides the output light to a second Erbium doped fiber 220 via a 1550/1590 nm WSC 226, thereby amplifying the L-band optical signal. The signal light traveling in the forward direction through a third optical isolator 222 is pumped by the second Erbium doped fiber 220 then continues traveling in the forward direction via a fourth optical isolator 224 to the output terminal. As a result, the EDFA amplifies the optical signal passing through the L-band second Erbium doped fiber 220 by recycling the C-band signal light. However, this type of conventional EDFA requires an additional light source and additional optical devices to amplify the L-band optical signals using the amplified C-band signals. As such, the manufacturing process of the fiber amplifier is complicated and its associated cost is increased.

SUMMARY OF THE INVENTION

The present invention overcomes the above-described problems, and provides additional advantages, by providing a long-band Erbium doped-fiber amplifier (L-band EDFA) with a simpler configuration that can be manufactured easily.

Accordingly, there is provided an L-band EDFA comprising: (a) a first Erbium doped fiber having a predetermined length, coupled to a first pumping light source through a first wavelength-selective coupler, for amplifying a C-band optical signal via a first pumping light source; (b) a second Erbium doped fiber having a predetermined length for amplifying an L-band optical signal via a second pumping light source; (c) a feedback loop for recycling a specific C-band wavelength generated in an amplification of the first Erbium doped fiber as the second pumping light source of the L-band optical signal; (d) a tap coupler, provided between the first and second Erbium doped fibers, for dividing the optical power amplified in the first Erbium doped fiber, supplying a predetermined ratio of optical power to the second Erbium doped fiber, and re-inputting the residual optical power to the feedback loop; and, (e) a second wavelength-selective coupler for coupling the signal light transmitted from the tap coupler to the first Erbium doped fiber.

In addition, there is provided an L-band EDFA comprising: (a) a first Erbium doped fiber of a predetermined length, coupled to a first pumping light source through a first wavelength-selective coupler, for amplifying a C-band optical signal by supplied pumping light; (b) a second Erbium doped fiber of a predetermined length for amplifying an L-band optical signal by a second pumping light source; and, (c) a grating unit having a first fiber-grating unit positioned in front of the first wavelength-selective coupler with high reflectivity, and a second fiber-grating unit positioned between the first and second Erbium doped fibers with low reflectivity.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. For the purposes of clarity and simplicity, well-known functions or constructions are not described in detail as they would obscure the invention in unnecessary detail.

Figure 1:
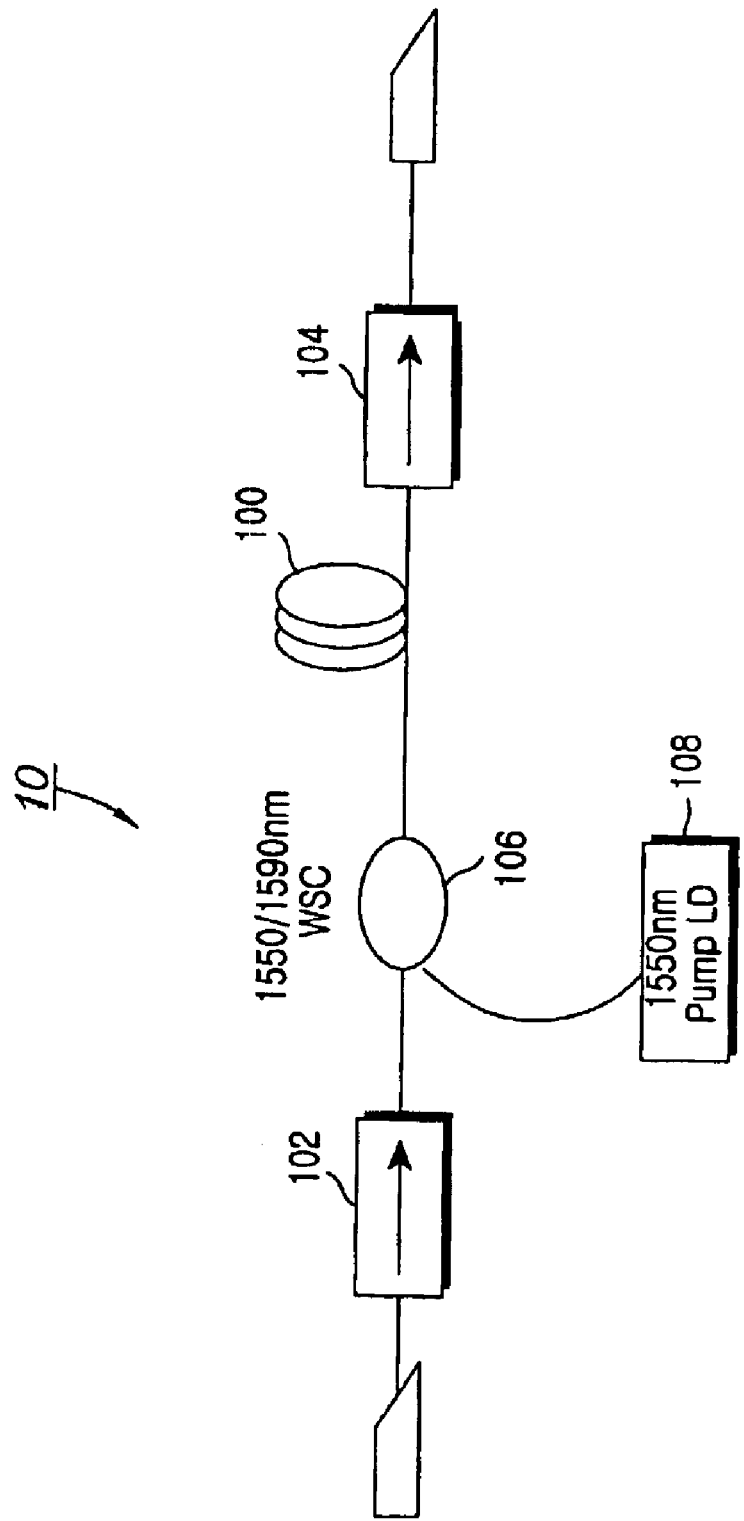
FIG. 1 is a structural diagram illustrating the first example of a conventional L-band EDFA.
Figure 2:
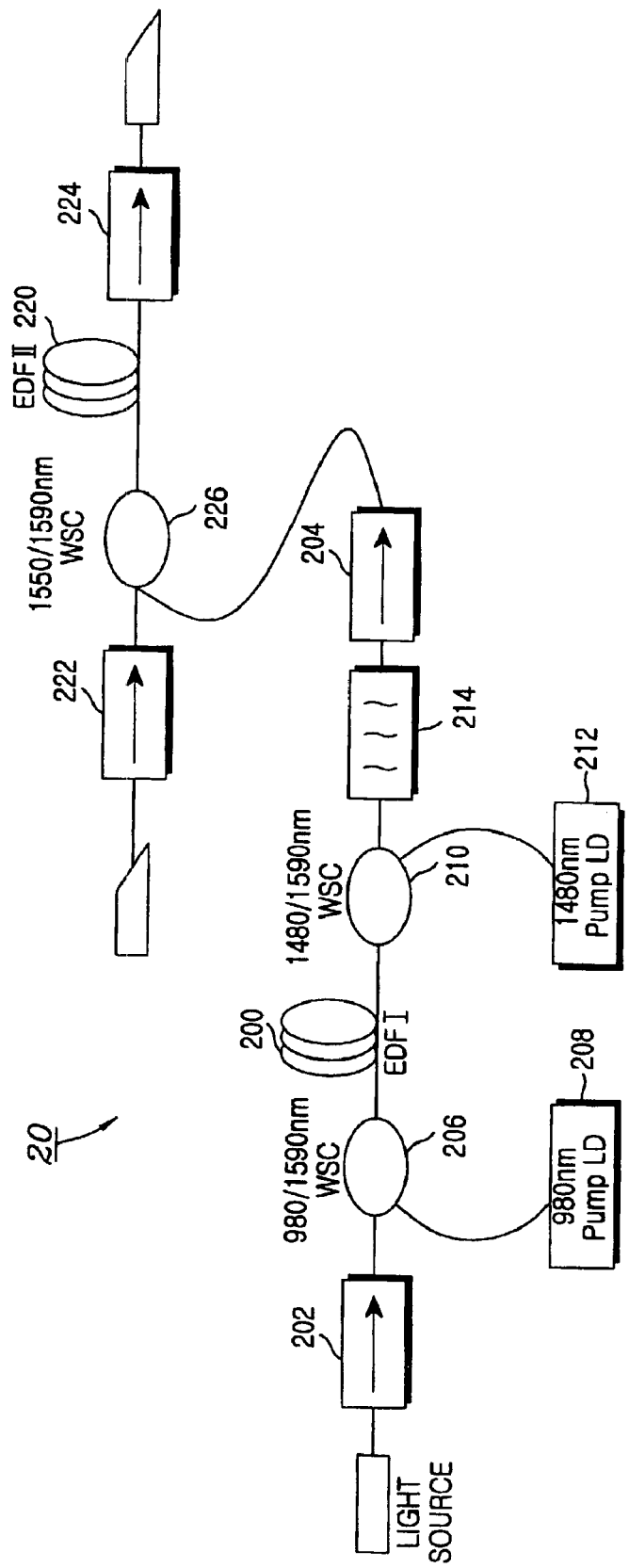
FIG. 2 is a structural diagram illustrating the second example of the conventional L-band EDFA.
Figure 3:
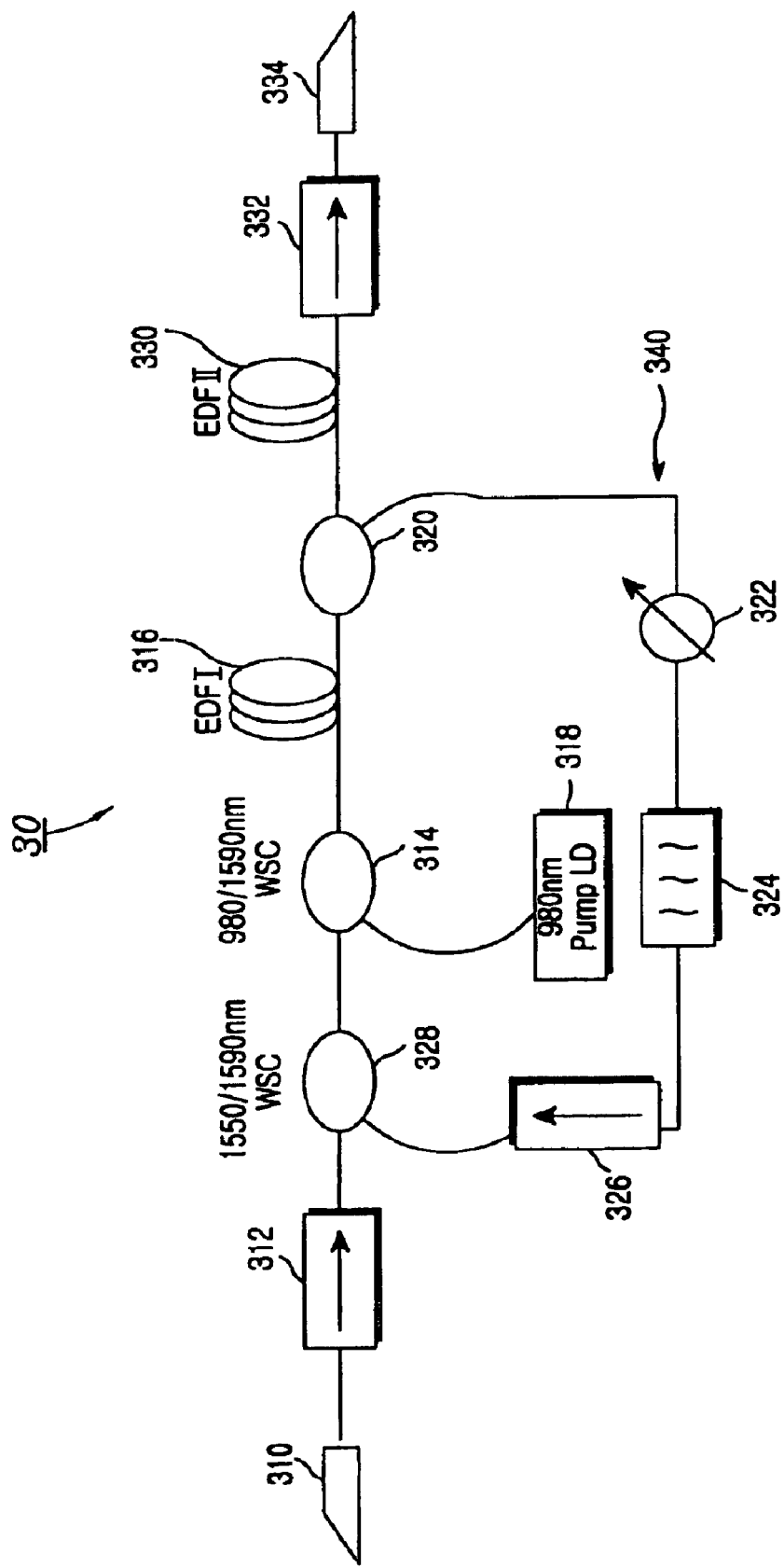
FIG. 3 is a structural diagram illustrating an L-band EDFA in accordance with a first embodiment of the present invention; and, FIG. 4 is a structural diagram illustrating an L-band EDFA in accordance with a second embodiment of the present invention.

FIG. 3 is a structural diagram illustrating the L-band EDFA 30 in accordance with a first embodiment of the present invention. As shown in FIG. 3, the L-band EDFA 30 includes first and second amplifying units, a feedback loop 340, a tap coupler 320 for coupling the feedback loop 340, and a wavelength-selective coupler (WSC) 328. The first and second amplifying units are defined by first and second Erbium doped fibers 316 and 330 with a predetermined length, where one of the rare-earth atoms, Erbium, is used as an amplification medium. The L-band EDFA 30 further includes a ring laser in front of the second Erbium doped fiber 330; a first optical isolator 312 for forwarding optical signals from an input terminal 310 in a forward direction; the first Erbium doped fiber 316 coupled to a 980 nm pumping laser diode 318 through a 980/1550 nm WSC 314; the feedback loop 340 for recycling a specific ASE wavelength generated in the amplification, an output port of which is coupled to the first Erbium doped fiber 316 in the forward direction using the 1550/1590 nm WSC 328 disposed between the first optical isolator 312 and the 980/1550 nm WSC 314, an input port of which is coupled behind the first Erbium doped fiber 316 using the tap coupler 320; the second Erbium doped fiber 330 formed behind the tap coupler 320, for amplifying an L-band optical signal by a second pumping light source supplied by the feedback loop 340; a second optical isolator 332 for forwarding the L-band optical signal amplified through the second Erbium doped fiber 330 in the forward direction; and, an output terminal 334 for outputting the optical signal from the second optical isolator 332.

Note that the tap coupler 320 transmits a predetermined ratio of optical power amplified through the first Erbium doped fiber 316 to the second Erbium doped fiber 330 through a port and also transmits the residual optical power to the feedback loop 340 through the port. Accordingly, a part of the optical power amplified through the first Erbium doped fiber 316 is transmitted to the second Erbium doped fiber 330 with the L-band optical signal and amplified again.

The feedback loop 340 includes a variable optical attenuator 322 for attenuating the specific ASE wavelength and further includes a tunable filter 324 for selecting a wanted wavelength from the optical signals passed through the variable optical attenuator 322. The optical signal filtered through the tunable filter 324 proceeds in the forward direction through the third optical isolator 326.

The amplified optical signal and ASE generated in the amplification of the C-band signal light are obtained by inputting a 980 nm pumping light to the first Erbium doped fiber 316. The amplified optical signal and ASE are passed through the variable optical attenuator 322 and the tunable filter 324 via the port of the tap coupler 320 to select a specific wavelength (most efficient in 1550 nm among the C-band wavelengths). Hence, it is possible to obtain the desired C-band wavelength by using the tunable filter 324. The specific C-band wavelength is re-transmitted to the first Erbium doped fiber 316 in the forward direction through the 1550/1590 nm WSC 328.

Now, the operation of the EDFA in accordance with the first embodiment of the present invention will be described hereinafter.

In operation, when an optical signal is inputted through the input terminal 310, it proceeds in a forward direction through the first optical isolator 312. Thereafter, when a 980 nm pumping light is supplied from the 980 nm pumping laser diode 318 to the first Erbium doped fiber 316 through the 980/1590 nm WSC 314, the C-band optical signal is amplified. Here, the ASE is generated during the amplification of the optical signal. The amplified optical signal and ASE are divided by the tap coupler 320 at a predetermined ratio. Then, some optical power is transmitted to the second Erbium doped fiber 330, and the residual optical power is transmitted to the feedback loop 340. Only a specific wavelength band (1550 nm) of the optical signal going to the feedback loop 340 is passed through the variable optical attenuator 322 and the tunable filter 324 and transmitted through the third optical isolator 326 in the forward direction. The specific C-band wavelengths passing through the third optical isolator 326 are coupled through the 1550/1590 nm WSC 328, then re-amplified and transmitted to the second Erbium doped fiber 330 via the tap coupler 320. Thus, the ring laser is formed by using the feedback loop 340, so that the C-band optical signal supplied through the feedback loop 340 can be used as the pumping light source for the L-band optical signal of the second Erbium doped fiber 330.

Note that a 1550/1590 nm WSC 328 can be replaced by a device, such as a tap coupler. However, in the first embodiment of the present invention, the EDFA 30 minimizes loss of the amplified optical signal by using the 1550/1590 nm WSC 328. The optical signal at a specific wavelength selected by the feedback process has a high output and inputted to the second Erbium doped fiber 330 as the pumping light, thereby amplifying the L-band optical signal. In addition, the ASE generated in the amplification of the C-band optical signal is used as the pumping light source of the L-band optical signal. Preferably, the first and second WSCS 314 and 328 may be selected from the group consisting of a grating, a band beam splitter, a thin film filter and a WDM device.

Figure 4:
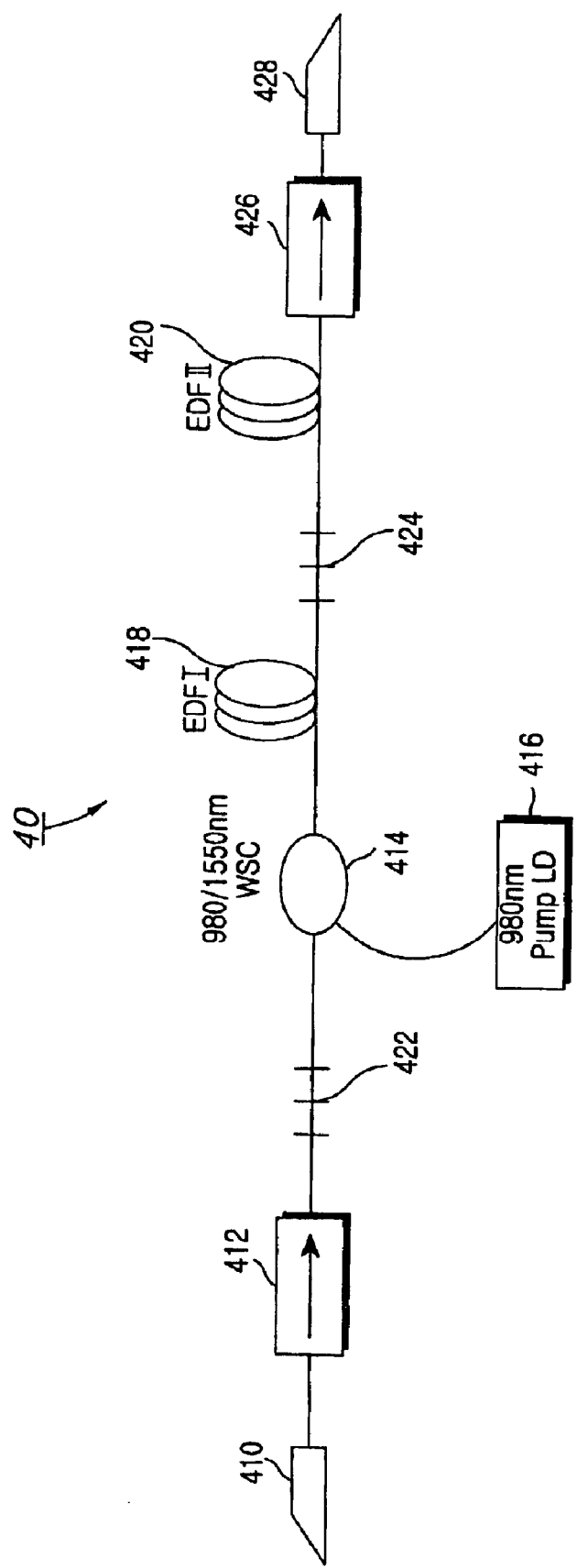

FIG. 4 is a structural diagram illustrating the L-band EDFA 40 in accordance with a second embodiment of the present invention. As shown in FIG. 4, the L-band EDFA 40 includes the first and second Erbium doped fibers 418 and 420, defining the first and second amplifying units. A ring laser is formed in front of the second Erbium doped fiber 420 and form the first and second fiber-grating units 422 and 424. Thus, a C-band optical signal supplied by forming the ring laser is transmitted to the second Erbium doped fiber 420 and used as the pumping light.

The L-band EDFA 40 comprises: a first optical isolator 412 for forwarding optical signals from an input terminal 410 in the forward direction; the first Erbium doped fiber 418 coupled to a 980 nm pumping laser diode 416 through a 980/1550 nm WSC 414 for receiving pumping light; the second Erbium doped fiber 420 formed behind the first Erbium doped fiber 418 for amplifying an L-band optical signal; a second optical isolator 426 for forwarding optical signals passing through the second Erbium doped fiber 420 in the forward direction; a first fiber-grating unit 422 disposed between the first optical isolator 412 and the 980/1550 nm WSC 414 for obtaining high reflectivity; and, a second fiber-grating unit 424 disposed between the first and second Erbium doped fibers 418 and 420 for obtaining low reflectivity. The first and second fiber-grating units 422 and 424 include a plurality of short-period fiber gratings that have the same wavelength property. The first fiber-grating unit 422 has high reflectivity, and the second fiber-grating unit 424 has low or anti-reflectivity. A plurality of short-period fiber-grating filters forming the first and second fiber gratings are designed to have a specific reflectivity and selectively reflect a specific wavelength. The first fiber-grating unit 422 and the second fiber-grating unit 424 behave as a Fabry-periot resonator. This is known as a high reflectivity/anti-reflectivity (HR/AR) in the laser diode. As such, in the resonator defined by the first and second fiber-grating units 422 and 424, light at a special wavelength selected by a length or section of the resonator is resonated, namely amplified toward low reflectivity.

In accordance with the second embodiment of the invention, the L-band EDFA 40 forms the resonator structure using the first and second fiber-grating units 422 and 424. The optical signal corresponding to the wavelength of the first and second fiber-grating units 422 and 424 can obtain a high output due to the pumping light of the first Erbium doped fiber 418 and the 980 nm pumping laser diode 416. That is, the L-band EDFA 40 supplies the C-band optical signal obtained through the first Erbium doped fiber 418, and the ASE generated in the amplification progresses towards the second Erbium doped fiber 420 as the pumping light source, thereby amplifying the L-band optical signal.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A long-band Erbium doped-fiber amplifier comprising:
   (a) a first Erbium doped fiber having a first predetermined length, coupled to a first pumping light source through a first wavelength-selective coupler, for amplifying a C-band optical signal via a first pumping light source;
   (b) a second Erbium doped fiber having a second predetermined length for amplifying an L-band optical signal via a second pumping light source;
   (c) a feedback loop for recycling a specific C-band wavelength generated in the amplification of the first Erbium doped fiber as the second pumping light source of the L-band optical signal;
   (d) a tap coupler disposed between the first and second Erbium doped fibers for dividing an optical-power output amplified in the first Erbium doped fiber, for supplying a predetermined ratio of the optical power output to the second Erbium doped fiber, and for supplying the residual optical power output to the feedback loop; and,
   (e) a second wavelength-selective coupler for coupling the output transmitted from the tap coupler to the first Erbium doped fiber.

2. The amplifier as claimed in claim 1, wherein the tap coupler supplies a predetermined ratio of output signal amplified in the first Erbium doped fiber to the second Erbium doped fiber and supplies the residual signal light to the feedback loop.

3. The amplifier as claimed in claim 1, wherein the feedback loop further comprises a tunable filter for propagating a specific selected wavelength.

4. The amplifier as claimed in claim 1, wherein the first wavelength-selective coupler is a 980/1550 nm wavelength-selective coupler.

5. The amplifier as claimed in claim 1, wherein the feedback loop further comprises an optical isolator for transmitting the wavelength selected by the first wavelength-selective coupler in a forward direction.

6. The amplifier as claimed in claim 1, wherein the second wavelength-selective coupler is a 1550/1590 nm wavelength-selective coupler.

7. A long-band Erbium doped fiber amplifier comprising:
   (a) a first Erbium doped fiber having a first predetermined length, coupled to a first pumping light source via a first wavelength-selective coupler, for amplifying a C-band optical signal;
   (b) a second Erbium doped fiber having a second predetermined length for amplifying an L-band optical signal using the C-band optical signal output obtained through the first Erbium doped fiber; and,
   (c) a grating unit having a first fiber-grating unit disposed in front of the first wavelength-selective coupler for supplying the C-band optical signal output with a high reflectivity, and a second fiber-grating unit disposed between the first and second Erbium doped fibers with an anti-reflectivity.

8. The amplifier as claimed in claim 7, wherein the first and second fiber-grating units comprise a plurality of short-period fiber gratings.

9. The amplifier as claimed in claim 7, wherein the wavelength-selective coupler is a 980/1550 nm wavelength-selective coupler.

10. The amplifier as claimed in claim 7, wherein the first and second fiber-grating units comprise gratings of the same wavelength property.

* * * * *